(12) United States Patent
LaBenz et al.

(10) Patent No.: US 8,528,880 B2
(45) Date of Patent: Sep. 10, 2013

(54) BUTTERFLY VALVE PLATE SEALING ASSEMBLIES

(75) Inventors: Joel LaBenz, Chandler, AZ (US); Craig Kolb, Apache Junction, AZ (US); Anthony Matarazzo, Queen Creek, AZ (US); Scott Martin, Mesa, AZ (US); Ryan Brown, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 12/845,608

(22) Filed: Jul. 28, 2010

(65) Prior Publication Data
US 2012/0025118 A1 Feb. 2, 2012

(51) Int. Cl.
*F16K 1/226* (2006.01)
(52) U.S. Cl.
USPC ............ 251/306; 251/357; 277/500; 277/637
(58) Field of Classification Search
USPC ................. 251/305–308, 357; 277/500, 637
See application file for complete search history.

(56) References Cited

U.S. PATENT DOCUMENTS

| | | | | | |
|---|---|---|---|---|---|
| 3,260,502 | A | * | 7/1966 | Plumer | 251/306 |
| 3,282,555 | A | * | 11/1966 | Mallonee, II et al. | 251/306 |
| 3,556,475 | A | * | 1/1971 | Olenik | 251/306 |
| 3,642,248 | A | * | 2/1972 | Benware | 251/172 |
| 4,003,394 | A | * | 1/1977 | Adams | 251/306 |
| 4,005,848 | A | * | 2/1977 | Eggleston | 251/307 |
| 4,162,782 | A | * | 7/1979 | Wilkins | 251/306 |
| 4,281,817 | A | * | 8/1981 | Adams et al. | 251/306 |
| 4,505,290 | A | * | 3/1985 | Scobie | 251/306 |
| 4,744,572 | A | * | 5/1988 | Sahba et al. | 277/641 |
| 4,899,984 | A | * | 2/1990 | Strickler et al. | 251/306 |
| 6,938,879 | B2 | | 9/2005 | Bancroft et al. | |
| 2009/0066034 | A1 | | 3/2009 | Jordan | |

* cited by examiner

*Primary Examiner* — John Bastianelli
(74) *Attorney, Agent, or Firm* — Ingrassia Fisher & Lorenz, P.C.

(57) ABSTRACT

A sealing assembly for use in a valve plate assembly includes a sealing ring and a retention spacer. The sealing ring has a radial ring section and an axial ring section, the axial ring section extends axially from the radial section and includes an outer diameter surface and a contact face, the contact face includes a contact surface and an annular slot, and the contact surface is located radially outward relative to the annular slot. The retention spacer is configured to be positioned adjacent the sealing ring.

14 Claims, 5 Drawing Sheets

BUTTERFLY VALVE PLATE SEALING ASSEMBLIES

TECHNICAL FIELD

The inventive subject matter relates to butterfly valve assemblies and, more particularly, to a butterfly valve sealing ring assembly for use with a butterfly plate.

BACKGROUND

Valves can be used to control flow from one portion of an aircraft to another. For example, pneumatic valves, such as butterfly valves, may be disposed in a duct between an air source and one or more outlets to control the flow of air distributed to aircraft systems such as, for example, the environmental control system or an aircraft cabin. Typically, a butterfly valve includes a valve flowbody and a butterfly plate. The valve flowbody is disposed between two ducts (or in a portion of a single duct) and has walls defining a flow channel. The butterfly plate is rotationally mounted to the valve flowbody and is positioned in the flow channel such that a minimum clearance is formed with the walls of the valve flowbody. An actuator and a spring may be used to control the rotation of the butterfly plate.

Typically, the butterfly plate is moved between open, partially open, and closed positions. When fluid flows through the valve flowbody in a forward direction, the butterfly plate moves to the open or partially open position to allow fluid to flow through the flow channel. When in the closed position, the butterfly plate is perpendicular or near perpendicular with respect to the walls of the valve flowbody to substantially block the flow channel and inhibit fluid from flowing through the flow channel. To seal the flow channel when the butterfly plate is in the closed position, a sealing ring is included in a sealing ring annular groove formed about a periphery of the butterfly plate to engage the wall of the flowbody.

During valve operation, fluid flowing through the flow channel exerts pressure against the butterfly valve plate. As a result, the sealing ring expands radially outwards to improve sealing. However, in some instances, pressure against the butterfly valve plate may exceed a threshold value. In such case, a sealing force between the sealing ring and wall of the butterfly plate forming the sealing groove may exceed an opposing friction force between the sealing ring and plate. Hence, the sealing ring may be prevented from radially expanding, and sealing between the outer periphery of the sealing ring and the wall of the flow channel may not be as effective as desired.

Accordingly, there is a need for a butterfly valve plate sealing assembly that provides improved sealability. More specifically, there is a need for sealing between the sealing ring and the butterfly plate that remains effective even when the valve is pressurized above a threshold pressure value. In addition, it would be desirable for the sealing assembly to be relatively inexpensive to implement. Furthermore, other desirable features and characteristics of the inventive subject matter will become apparent from the subsequent detailed description and the appended claims, taken in conjunction with the accompanying drawings and the foregoing technical field and background.

BRIEF SUMMARY

Valve plate assemblies and sealing assemblies are provided.

In an embodiment, by way of example only, a valve plate assembly includes a plate having a first outer diameter surface and an annular groove, the annular groove formed in an outer periphery of the plate and including an opening section and a cavity section, the opening section extending from the first outer diameter surface to the cavity section. The assembly also includes a sealing ring having a radial ring section and an axial ring section, the radial ring section extending through the opening section of the annular groove into the cavity section of the annular groove, the axial ring section disposed in the cavity section of the annular groove and extending axially from the radial section toward a surface defining the cavity section of the annular groove, the axial ring section including a second outer diameter surface and a sealing face, the contact face adjacent to the surface defining the cavity section and including a contact surface and an annular slot, the contact surface configured to contact the surface defining the cavity section and located radially outward relative to the annular slot, the annular channel forming a gap between the surface defining the cavity section and at least a portion of the sealing face.

In another embodiment, by way of example only, a sealing assembly includes a sealing ring and a retention spacer. The sealing ring has a radial ring section and an axial ring section, the axial ring section extends axially from the radial section and includes an outer diameter surface and a sealing face, the contact face includes a contact surface and an annular slot, and the contact surface is located radially outward relative to the annular slot. The retention spacer is configured to be positioned adjacent the sealing ring.

Other independent features and advantages of the preferred means for retaining a butterfly valve sealing ring within a sealing ring annular groove formed about a periphery of a butterfly valve plate in a butterfly valve will become apparent from the following detailed description, taken in conjunction with the accompanying drawings which illustrate, by way of example, the principles of the inventive subject matter.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

A butterfly valve plate sealing assembly is provided that has improved sealing capabilities over conventional butterfly valve plate sealing assemblies. The improved butterfly valve plate sealing assembly includes a butterfly plate having an annular groove formed in its outer periphery within which a sealing ring is partially disposed. The sealing ring includes a contact face for contact with a surface defining the annular groove, and an annular channel is formed in the sealing face. In an embodiment, the contact face also includes a torsion stop formed radially inward relative to the annular groove. The torsion stop is configured to prevent the sealing ring from rotating within the annular groove. The butterfly valve plate sealing assembly may be implemented in a variety of different systems which may benefit from improved sealing. For example, the butterfly valve may be included in an air distribution system or another system in which fluid flows.

Figure 1:
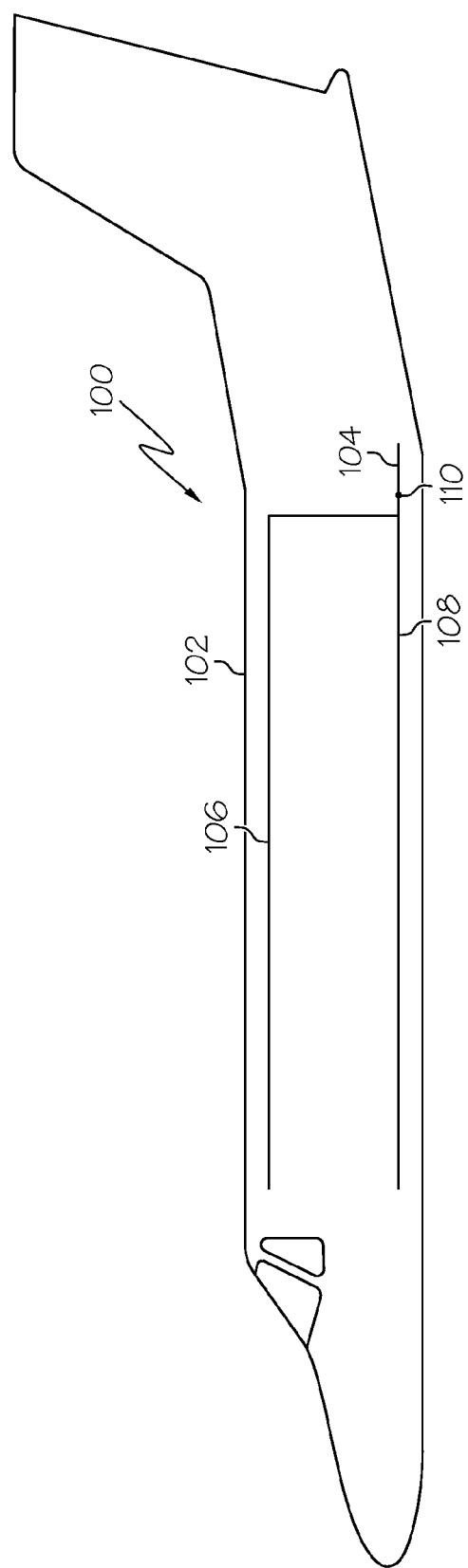
FIG. 1 is a simplified schematic diagram illustrating an exemplary air distribution system disposed within an aircraft, according to an embodiment.

FIG. 1 is a simplified schematic diagram illustrating an air distribution system 100 disposed within an aircraft 102, according to an embodiment. The air distribution system 100 includes an inlet duct 104, two outlet ducts 106, 108 and a butterfly valve plate sealing assembly 110 positioned between the ducts 104, 106, 108. The inlet duct 104 receives air, such as engine bleed air, from an air source, and the outlet ducts 106, 108 exhaust air into desired sections of the aircraft 102. In one exemplary embodiment, the outlet ducts 106, 108 exhaust air into an aircraft underfloor. Although two outlet ducts 106, 108 are depicted, fewer or more outlet ducts may be incorporated into the air distribution system 100 in other embodiments. The sealing assembly 110 regulates air flow through one or more of the outlet ducts 106, 108 by opening or closing in response to the presence or absence of a pressure differential across the sealing assembly 110 that exceeds a predetermined value.

Figure 2:
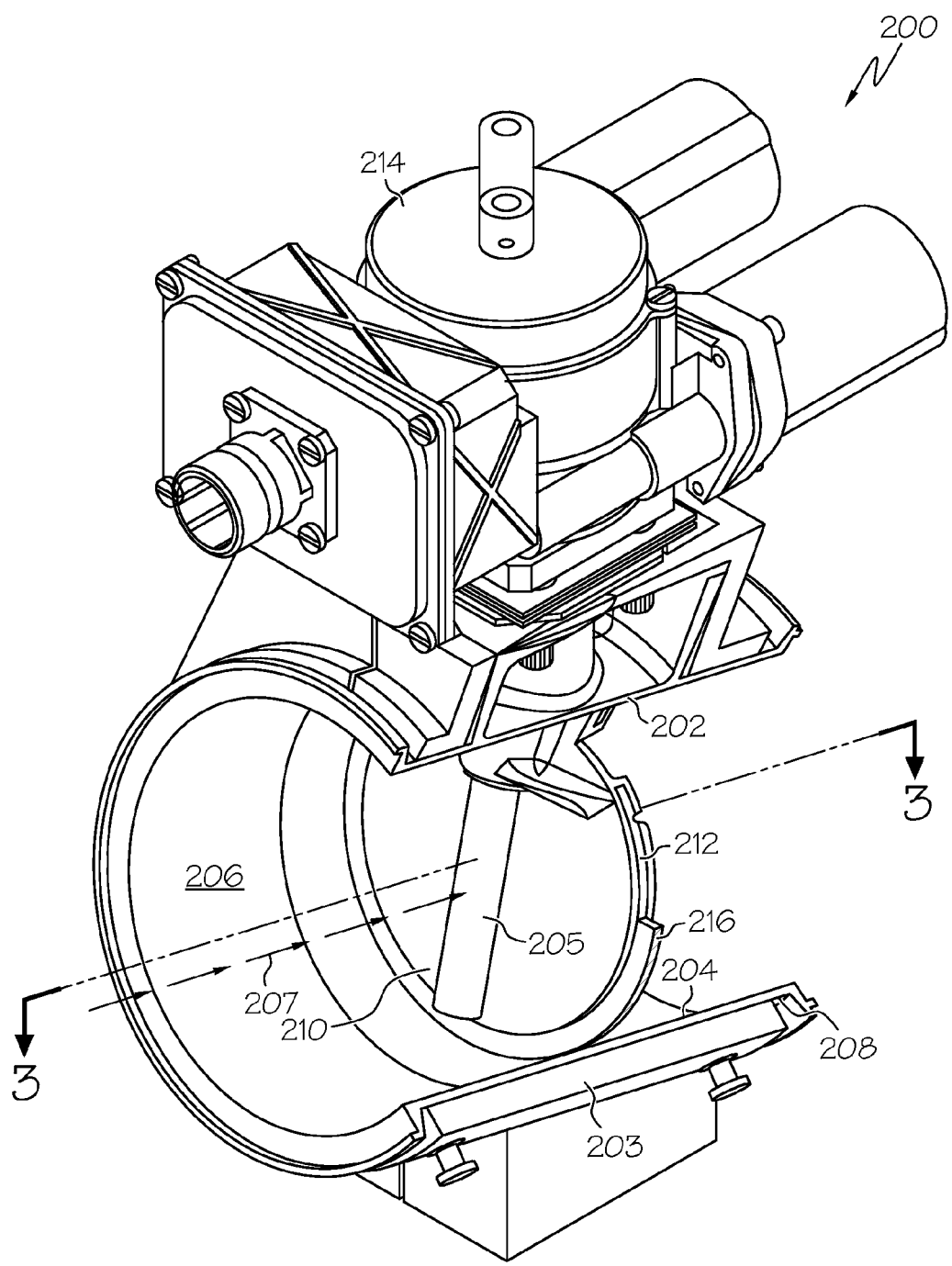
FIG. 2 is a cutaway view of a valve assembly that may be implemented into the air distribution system shown in FIG. 1, according to an embodiment.

FIG. 2 is a cross-sectional view of a butterfly valve assembly 200 that may be implemented into an air distribution system, such as system 100 shown in FIG. 1, according to an embodiment. The valve assembly 200 includes a valve flowbody 202 having an inner surface 204 that defines a channel 206 and an outer surface 208. The valve flowbody 202 is generally made of a metallic material, although alternate non-metallic materials can be used in other embodiments. Examples of suitable materials may include, but are not limited to, aluminum alloys, steel or titanium. Although the valve flowbody 202 has a single channel 206 in the depicted embodiment, other embodiments include multiple channels. In an embodiment, the valve flowbody 202 may be surrounded by an insulator 203.

The channel 206 defines a flow path, indicated by arrows 207, through the valve assembly 200 which is opened and closed via rotation of a butterfly valve plate 210 disposed in the channel 206. The butterfly valve plate 210 is rotationally mounted to the valve flowbody 202 about a shaft 205. In an example, the channel 206 has a diameter in a range of about 25.0 mm to about 175.0 mm, and the butterfly valve plate 210 has an outer diameter in a range of about 24.5 mm to about 174.0 mm and a thickness in a range of about 1.0 mm to about 2.0 mm. In other embodiments, the diameters and thickness are greater or less than the aforementioned range. Although the particular dimensions of the channel 206 or butterfly valve plate 210 are not critical to the inventive subject matter, the segment of the channel 206 within which the butterfly valve plate 210 rotates preferably is cylindrical and has an internal diameter approximately equal to the diameter of the butterfly valve plate 210.

The butterfly valve plate 210 may be coupled to an actuator 214 that causes it to selectively open or close via a single drive shaft, two drive shaft segments or by some other mechanism suitable for rotating the butterfly valve plate 210 about an axis of rotation passing through the channel 206. In some instances, the axis of rotation may be perpendicular to the centerline of the channel 206, while in other instances it need not be perpendicular. In addition, the butterfly valve plate 210 may be tilted relative to a centerline of a drive shaft. The actuator 214 may comprise an actuating mechanism capable of employing pressure differentials to open and close the valve assembly 200. In an alternate embodiment, electrical power will be used to open and close the valve assembly 200. More particularly, the actuator 214 may include, but is not limited to, an electric actuator, a pneumatic actuator, a hydraulic actuator or a manual actuator.

The butterfly valve plate 210 operates to at least partially open and close the flow path 207 defined by the channel 206. In an embodiment, the butterfly valve plate 210 comprises a unitary structure cast or otherwise formed from steel, a metallic alloy, some other material or combination of materials. The butterfly valve plate 210 includes a sealing ring annular groove 212 within which a butterfly sealing assembly 216 is retained.

Figure 3:
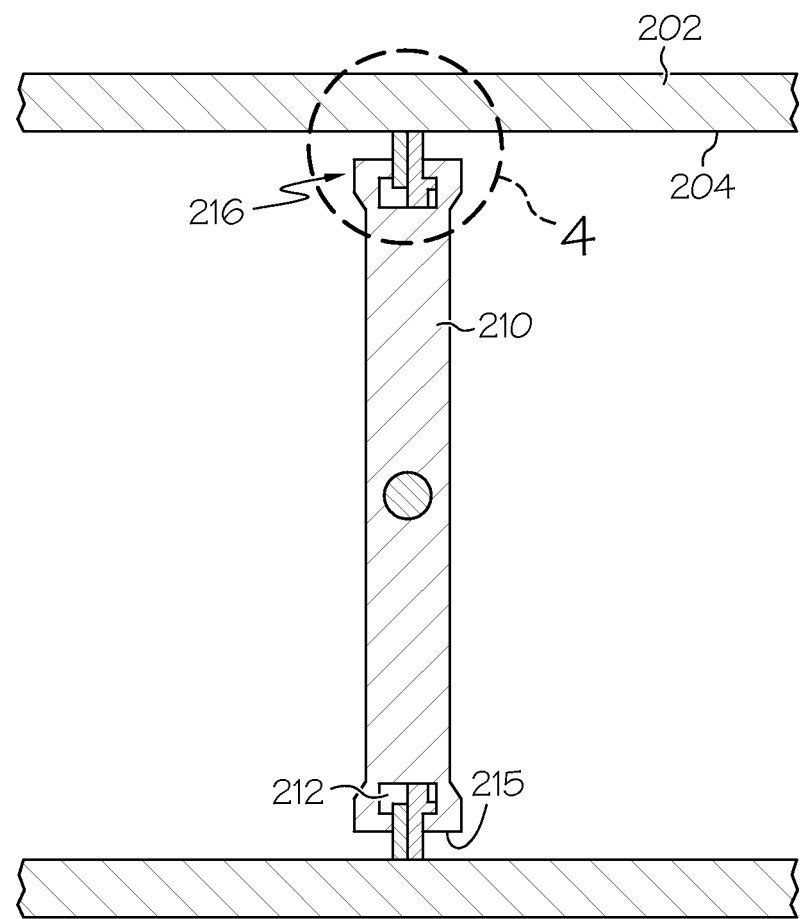
FIG. 3 is a cross-sectional view of a portion of the valve assembly shown in FIG. 2 taken along line 3-3, according to an embodiment.
Figure 4:
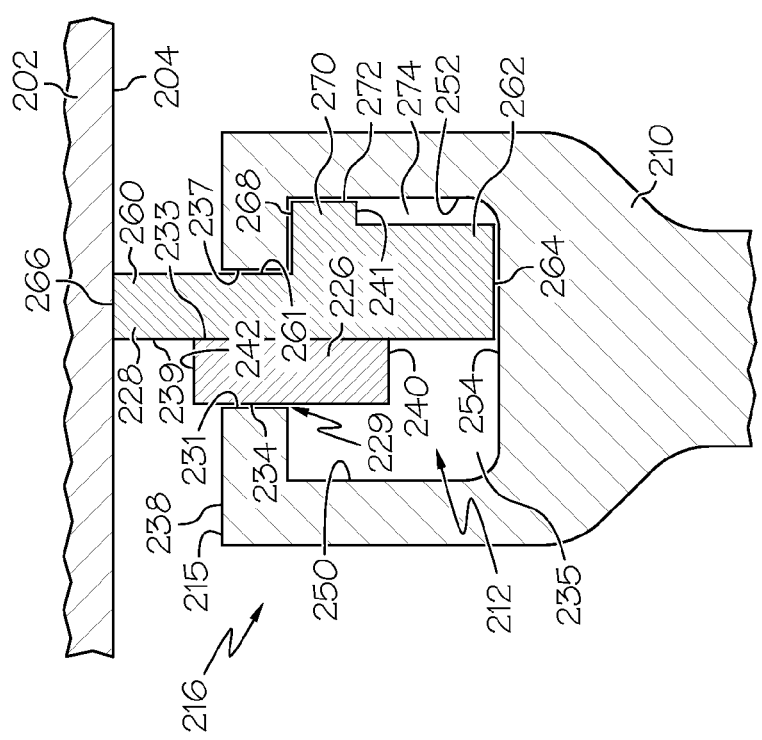
FIG. 4 is a close-up cross-sectional view of a portion of a valve assembly according to an embodiment.

FIG. 3 is a close up cross-sectional view of a portion of the butterfly valve assembly 200 shown in FIG. 2, and FIG. 4 is a close-up cross-sectional view of the butterfly sealing assembly 216 indicated by dotted line 4 shown in FIG. 3, according to an embodiment. The portion of the valve assembly 200 includes the butterfly valve plate 210 and the butterfly sealing assembly 216. As alluded to above, the sealing ring annular groove 212 is formed in a periphery 215 of the butterfly valve plate 210, and as shown in FIG. 4, includes an opening section 234 and a cavity section 235. As used herein, the term "periphery" is defined as an area including an outer circumferential edge of the butterfly valve plate 210.

The opening section 234 extends radially inward from an outer diameter surface 238 of the butterfly valve plate 210. In an embodiment, the opening section 234 extends inward (toward the center of the butterfly valve plate 210) a depth in a range of about 2.0 mm to about 4.0 mm. In another embodiment, the depth is greater or less than the aforementioned range. The opening section 234 also has a width, measured between radial walls 231, 237, that is sufficient to accommodate a combined thickness of the components of the butterfly sealing assembly 216. The width can fall within a range of about 2.0 mm to about 4.0 mm. In another embodiment, the width may be greater or less than the aforementioned range.

The cavity section 235 is located radially inwardly from the opening section 234 and is defined by a first radial wall 250, a second radial wall 252, and an inner axial wall 254. Depending on assembly, the first or second radial wall 250, 252 can serve as a surface against which a contact surface 272 of the sealing assembly 216 seals. The cavity section 235 has a depth that is greater than the depth of the opening section 234, in an embodiment. In an example, the depth of the cavity section measured from the opening section 234 to the inner axial wall 254 is in a range of about 2.0 mm to about 6.0 mm. In another embodiment, the depth is greater or less than the aforementioned range. In other embodiments, the depth is less than or substantially equal to the depth of the opening section 234. In any case, a width of the cavity section 235 measured between the first and second radial walls 250, 252 is greater than the width of the opening section 234. In an embodiment, the width is in a range of about 3.0 mm to about 5.0 mm. In another embodiment, the width is greater or less than the aforementioned range.

Although the sealing ring annular groove 212 is depicted as being formed in the butterfly valve plate 210, the groove 212 alternatively may be formed in a surface of a separate element coupled to the butterfly valve plate 210, in an embodiment. In another embodiment, separate members are added to the butterfly valve plate 210 to form the first and second radial walls 250, 252, while a surface of the butterfly valve plate 210 serves as the inner axial wall 254 of the groove 212.

The sealing assembly 216 includes a retention spacer 226 and a sealing ring 228, which cooperate to form a substantially leak tight seal against the surface 204 of the flowbody 202. The retention spacer 226 is disposed adjacent to and on a pressure-receiving side of the sealing ring 228 and is configured to retain the sealing ring 228 within the sealing ring annular groove 212. In this regard, the retention spacer 226 and the sealing ring 228 both extend at least partially through a portion of the opening section 234 of the groove 212 and together have a total thickest portion that is substantially equal to the width of the opening section 234. The retention spacer 226 may be thicker than the sealing ring 228, in an embodiment. In other embodiments, the retention spacer 226 is thinner than the sealing ring 228. The retention spacer 226 comprises a unitary structure formed from steel, a metallic alloy, or some other material or combination of materials. The retention spacer 226 is generally formed having a stiffness factor that is greater than a stiffness factor of the sealing ring 228 to minimize expansion of the retention spacer 226 from within the sealing ring annular groove 212.

The retention spacer 226 is generally ring-shaped and includes a pressure side face 229 and a sealing ring contact face 233. The pressure side face 229 is disposed in contact with a first radial wall 231 of the opening section 234. The retention spacer 226 can have a radial length measured from an inner diameter surface 240 to an outer diameter surface 242 in a range of about 4.0 mm to about 5.0 mm. For example, the retention spacer 226 can contact and extend from the inner axial wall 254 of the groove 212 to the outer periphery 215 of the butterfly valve plate 210, or the inner diameter surface 240 of the retention spacer 226 can be spaced a distance apart from the inner axial wall 254 of the groove 212. To allow the sealing ring 228 to receive the bulk of the pressure exerted on the sealing assembly 216, the retention spacer 226 is dimensioned to form a gap with the inner surface 204 of the flowbody 202. In FIG. 4, this gap is defined between the inner surface 204 and the outermost (top) surface of the sealing ring 228. The gap can have a measurement in a range of about 0.2 mm to about 0.6 mm. In other embodiments, the gap is greater or less than the aforementioned range.

Although a single retention spacer 226 is shown in FIG. 3, other embodiments can include additional spacers or other components disposed between the retention spacer 226 and the sealing ring 228. In such case, the sealing ring contact face 233, which is located opposite the pressure side face 229, may seal against and contact an adjacent one of the additional spacers or other components. In embodiments in which a single retention spacer 226 is included, the contact face 233 contacts a pressure side surface 239 of the sealing ring 228.

In preferred embodiments the sealing ring 228 comprises a unitary structure formed from a non-metallic, steel, a metallic alloy, or some other material or combination of materials. The sealing ring 228 includes a radial ring section 260 and an axial ring section 262. The radial ring section 260 is ring-shaped and extends radially outward to seal against the inner surface 204 of the flowbody 202. In this regard, the radial ring section 260 is configured to extend from the cavity section 235 and through the opening section 234 of the sealing groove 212 to the flowbody 202. A radial length of the radial ring section 260 measured from an inner diameter surface 264 to an outer diameter surface 266 of the sealing ring 228 is in a range of about 4.0 mm to about 6.0 mm. In other embodiments, the radial length is longer or shorter than the aforementioned range, having a maximum distance measured between the inner axial wall 254 of the groove 212 and the inner surface 204 of the flowbody 202. Sealing surface 261 of the radial ring section 260 seals against the radial wall 237 of opening section 234 of the butterfly valve plate 210.

The axial ring section 262 is configured to be disposed in the cavity section 235 of the annular groove 212 and to extend toward the second radial wall 252 of the annular groove 212. In this regard, the axial ring section 262 is tubular and extends axially from the radial ring section 260. In an embodiment, the axial ring section 262 extends substantially orthogonal (e.g., 90°±5°) relative to the radial ring section 260. In other embodiments, the axial ring section 262 flares radially outward or inward at an angle relative to the radial ring section 260. Although the axial ring section 262 is depicted as extending from the inner diameter surface 264 of the radial ring section 260, other embodiments may include the radial ring section 260 extending from a location radially outward relative to the inner diameter surface 264.

The axial ring section 262 includes an outer diameter surface 268 providing an outer diameter in a range of about 24 mm to about 174 mm. In other embodiments, the outer diameter is greater or less than the aforementioned range. The axial ring section 262 shares the pressure side surface 239 of the radial ring section 260 and extends toward a contact face 270, which is configured to be adjacent to second radial wall 252 of the annular groove 212. In an embodiment, a longest axial length of the axial ring section 262 (measured from the pressure side surface 239 to the contact face 270) is in a range of about 2.0 mm to about 3.0 mm. In other embodiments, the longest axial length is greater or less than the aforementioned range. The contact face 270 has a radial length (measured from the inner diameter surface 241 to the outer diameter surface 268 in a range of about 1.0 mm to about 2.0 mm. In other embodiments, the radial length is greater or less than the aforementioned range.

During operation, pressure exerted on the pressure side surface 239 may exceed a threshold pressure value to thereby increase a sealing pressure exerted on the axial ring section 262. In such case, the axial ring section 262 may be unable to overcome opposing friction forces that result between the sealing ring 228 and the plate 210, which may cause the sealing ring 228 to undesirably remain in contact with the radial wall 252 of the annular groove 212. As a result, the sealing ring 228 may not be capable of expanding radially outward as desired and may not seal with the inner surface 204 of the flow body 202. To relieve the pressure exerted on the axial ring section 262, the contact face 270 includes an annular channel 274 formed therein.

The annular channel 274 is continuous around the ring 228 and is located radially inward from the outer diameter surface 268 of the axial ring section 262 to define a contact surface 272 on the contact face 270. The contact surface 272 is configured to contact the radial wall 252 of the annular groove 212 so that the annular channel 274 can provide a gap between the contact face 270 and the radial wall 252 of the annular groove 212. To allow the sealing ring 228 to move against the valve plate 210 during operation, the annular channel 274 is located radially inward relative to the outer diameter surface 268 such that the contact surface 272 has an area sufficient to allow the sealing ring 228 to overcome opposing friction forces when pressure is exerted against the axial ring section 262.

The contact surface 272 may extend around an entirety of the sealing ring 228. In an example, the contact surface 272 is continuous around the contact face 270 of the ring 228. In another embodiment, the contact surface 272 may include axially-extending gaps, slits or annular slots.

The annular channel 274 can form a gap with the radial wall 252 in a range of about 0.25 mm to about 1.0 mm. In FIG.

4, this gap corresponds to the horizontal distance between the radial wall 252 and the rightmost surface of the axial ring section 262. In other embodiments, the gap is wider or narrower than the aforementioned range. The annular channel 274 can extend from the contact surface 272 to the inner diameter surface 264 of the sealing ring 228 as shown in FIG. 4, in an embodiment. In other embodiments, the annular channel 274 may have a different configuration.

Figure 5:
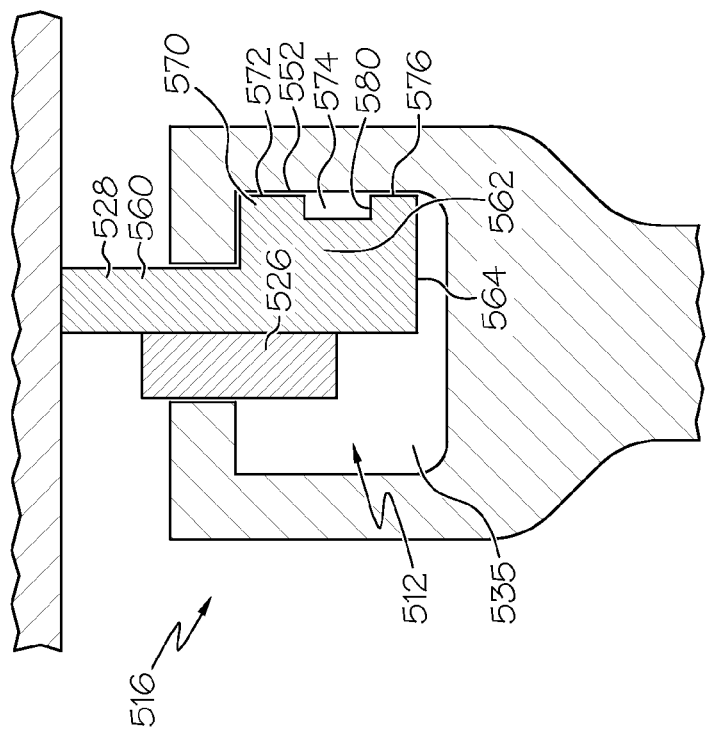
FIG. 5 is a close-up cross-sectional view of a portion of a valve assembly according to another embodiment.

FIG. 5 is a close-up cross-sectional view of a butterfly valve plate sealing assembly 516, according to another embodiment. Here, the sealing assembly 516 includes a retention spacer 526 and an annular groove 512 configured in a manner similar to retention spacer 226 and annular groove 212. The sealing assembly 516 also includes a sealing ring 528 having a radial ring section 560 and an axial ring section 562. The axial ring section 562 has a contact face 570 with a contact surface 572 and annular channel 574. The sealing ring 528 also has a torsion stop 576 included on its contact face 570. The torsion stop 576 is configured to contact a surface 552 to prevent the sealing ring 228 from rotating in the annular groove 512 and is formed radially inward relative to an annular channel 574 in the contact face 570.

Figure 6:
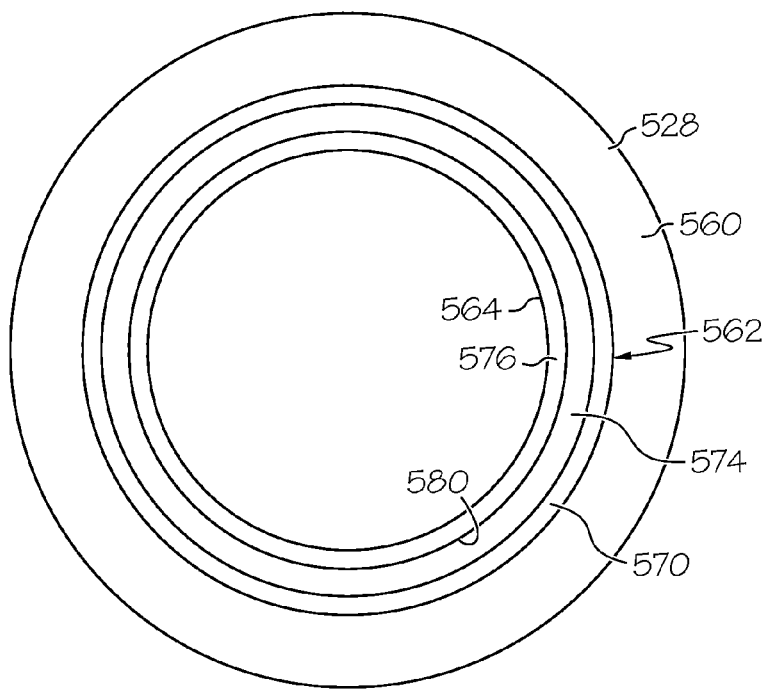
FIG. 6 is a elevation view of the sealing ring in FIG. 5, according to an embodiment.

FIG. 6 is an elevation view of the sealing ring 528 of FIG. 5 including the torsion stop 576, according to an embodiment. The sealing ring 528 has an inner diameter surface 564, and the torsion stop 576 extends an entirety of a space between an inner edge 580 of the annular channel 574 to the inner diameter surface 564 of the sealing ring 528, in an embodiment. The torsion stop 576 may have an area that is about 10% to about 50% of a total area of the contact face 570. Thus, for example, a radial length of the torsion stop 576 measured from the inner edge 580 of the annular channel 574 to the inner diameter surface 564 may be in a range of about 10% to about 25% of the total radial length of the contact face 570. In another embodiment, the torsion stop 576 may comprise more or less of the contact face 570. In yet other embodiments, the torsion stop 576 may extend only partially to the inner diameter surface 564 of the sealing ring 528.

Figure 7:
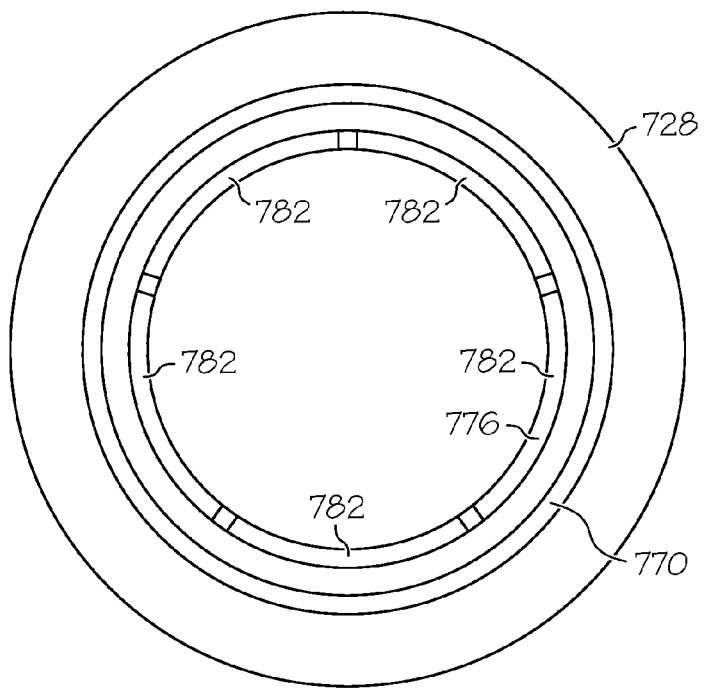
FIG. 7 is a elevation view of a sealing ring, according to another embodiment.

Although depicted in FIG. 6 as forming a continuous ring around the sealing ring 528, the torsion stop 576 can be segmented in other embodiments. FIG. 7 is an elevation view of a sealing ring 728, according to another embodiment. Here, the sealing ring 728 has a torsion stop 776 included on its contact face 770 that is segmented. The segments 782 making up the torsion stop 776 form a ring. Although five segments 782 are included, more or fewer segments may be included in other embodiments. Moreover, although the segments 782 are shown as being substantially uniform in size and configuration, one or more of the segments may be larger or smaller than the others in another embodiment.

By including an annular channel in the contact face of the sealing ring, a contact area between the contact surface of the sealing ring and the butterfly valve plate is reduced to thereby relieve pressure on the contact face and allow the sealing ring to expand radially outward to provide an improved seal. The torsion stop prevents the sealing ring from rotating within the annular groove. In addition to providing the improved sealing capabilities, the sealing assembly may have an increased life expectancy as compared to conventional valves incorporating traditional sealing rings. In addition, the sealing assembly may be lightweight and relatively inexpensive to implement.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A butterfly valve plate sealing assembly comprising:
   a plate having a first outer diameter surface and an annular groove, the annular groove formed in an outer periphery of the plate and including an opening section and a cavity section, the opening section extending from the first outer diameter surface to the cavity section;
   a sealing ring having a radial ring section and an axial ring section, the radial ring section extending through the opening section of the annular groove into the cavity section of the annular groove, the axial ring section disposed in the cavity section of the annular groove and extending axially from the radial section toward a surface defining the cavity section of the annular groove, the axial ring section including a second outer diameter surface and a contact face, the contact face adjacent to the surface defining the cavity section and including a contact surface and an annular channel, the contact surface configured to contact the surface defining the cavity section and located radially outward relative to the annular channel, the annular channel forming a gap between the surface defining the cavity section and at least a portion of the contact face; and
   a retention spacer positioned adjacent the sealing ring and within the opening section of the annular groove.

2. The butterfly valve plate sealing assembly of claim 1, wherein the axial ring section is substantially orthogonal relative to the radial ring section.

3. The butterfly valve plate sealing assembly of claim 1, wherein the sealing ring has an inner diameter surface and the annular channel extends to the inner diameter surface.

4. The butterfly valve plate sealing assembly of claim 1, wherein the contact face of the axial ring section includes a torsion stop configured to contact the surface defining the cavity section of the annular groove, the torsion stop located radially inward relative to the annular channel.

5. The butterfly valve sealing assembly of claim 4, wherein the torsion stop is continuous around the sealing ring.

6. The butterfly valve sealing assembly of claim 4, wherein the torsion stop is segmented around the sealing ring.

7. The butterfly valve plate sealing assembly of claim 1, wherein the annular channel is continuous around the sealing ring.

8. A butterfly valve plate sealing assembly comprising:
   a plate having a first outer diameter surface and an annular groove, the annular groove formed in an outer periphery of the plate and including an opening section and a cavity section, the opening section extending from the first outer diameter surface to the cavity section;
   a sealing ring having a radial ring section and an axial ring section, the radial ring section extending through the opening section of the annular groove into the cavity section of the annular groove, the axial ring section disposed in the cavity section of the annular groove and extending axially from the radial section toward a surface defining the cavity section of the annular groove, the axial ring section including a second outer diameter surface and a contact face, the contact face adjacent to the surface defining the cavity section and including a contact surface and an annular channel, the contact surface configured to contact the surface defining the cavity section and located radially outward relative to the annular channel, the annular channel forming a gap between the surface defining the cavity section and at least a portion of the contact face;

a retention spacer positioned adjacent the sealing ring and disposed at least partially within the annular groove, wherein the contact face of the axial ring section includes a torsion stop configured to contact the surface defining the cavity section of the annular groove, the torsion stop located radially inward relative to the annular channel.

9. The butterfly valve sealing assembly of claim 8, wherein the torsion stop is continuous around the sealing ring.

10. The butterfly valve sealing assembly of claim 8, wherein the torsion stop is segmented around the sealing ring.

11. The butterfly valve plate sealing assembly of claim 8, wherein the annular channel is continuous around the sealing ring.

12. The butterfly valve plate sealing assembly of claim 8, wherein the retention spacer is positioned within the opening section of the annular groove and adjacent the sealing ring.

13. The butterfly valve plate sealing assembly of claim 8, wherein the axial ring section is substantially orthogonal relative to the radial ring section.

14. The butterfly valve plate sealing assembly of claim 8, wherein the sealing ring has an inner diameter surface and the annular channel extends to the inner diameter surface.

* * * * *